United States Patent [19]
Shelstad

[11] Patent Number: 6,155,407
[45] Date of Patent: Dec. 5, 2000

[54] CONVEYOR BELT IMPACT SUPPORT SYSTEM

[75] Inventor: Delmer Leroy Shelstad, Gillette, Wyo.

[73] Assignee: Dust Control, Inc., Gillette, Wyo.

[21] Appl. No.: 09/348,446

[22] Filed: Jul. 7, 1999

[51] Int. Cl.$^7$ .................................................. B65G 15/08
[52] U.S. Cl. ........................... 198/830; 198/826; 198/525
[58] Field of Search ..................................... 198/826, 828, 198/830, 837, 525

[56] References Cited

U.S. PATENT DOCUMENTS

| | | | |
|---|---|---|---|
| 2,974,777 | 3/1961 | Marsh | 198/830 X |
| 3,294,218 | 12/1966 | Chantland | 198/826 |
| 5,044,490 | 9/1991 | East | 198/830 |
| 5,564,557 | 10/1996 | Spencer | 198/830 |

FOREIGN PATENT DOCUMENTS

| | | | |
|---|---|---|---|
| 241578 | 12/1986 | Germany | 198/826 |
| 583047 | 12/1977 | U.S.S.R. | 198/826 |
| 901182 | 1/1982 | U.S.S.R. | 198/826 |

OTHER PUBLICATIONS

Martin Engineering Company, "Belt Support System", 1990 (Brochure).
Arch Environmental Equipment, Inc., "Simplicity Impact System", no date (Brochure).

*Primary Examiner*—James R. Bidwell
*Attorney, Agent, or Firm*—Blackwell Sanders Peper Martin

[57] ABSTRACT

A belt support system for supporting a belt member along a portion thereof during a material transfer operation where a flow of material is allowed to impact the belt member at a predetermined impact location, the present system including a plurality of roller members housed in three separate members which are positioned in side-by-side relationship to each other, the center member being secured to a support structure and the two opposed end or wing members being each pivotally mounted to the center member and to the support structure so as to be angularly adjustable relative to the center member. The pivotal adjustability of the three members allows the present system to be positionable so as to conform to the particular configuration of the belt member to be supported such as a cradle or containment channel configuration typically formed by many bulk conveyor belt transfer systems, and use of the roller members substantially reduces friction between the support system and the conveyor belt moving thereacross at the impact location. Use of the present system helps to alleviate the forces and stresses applied to the belt member at the impact location; it stabilizes the belt member at the impact location to substantially reduce material spillage and fugitive dust emissions; and it increases the overall longevity of the belt member and other conveyor components.

10 Claims, 4 Drawing Sheets

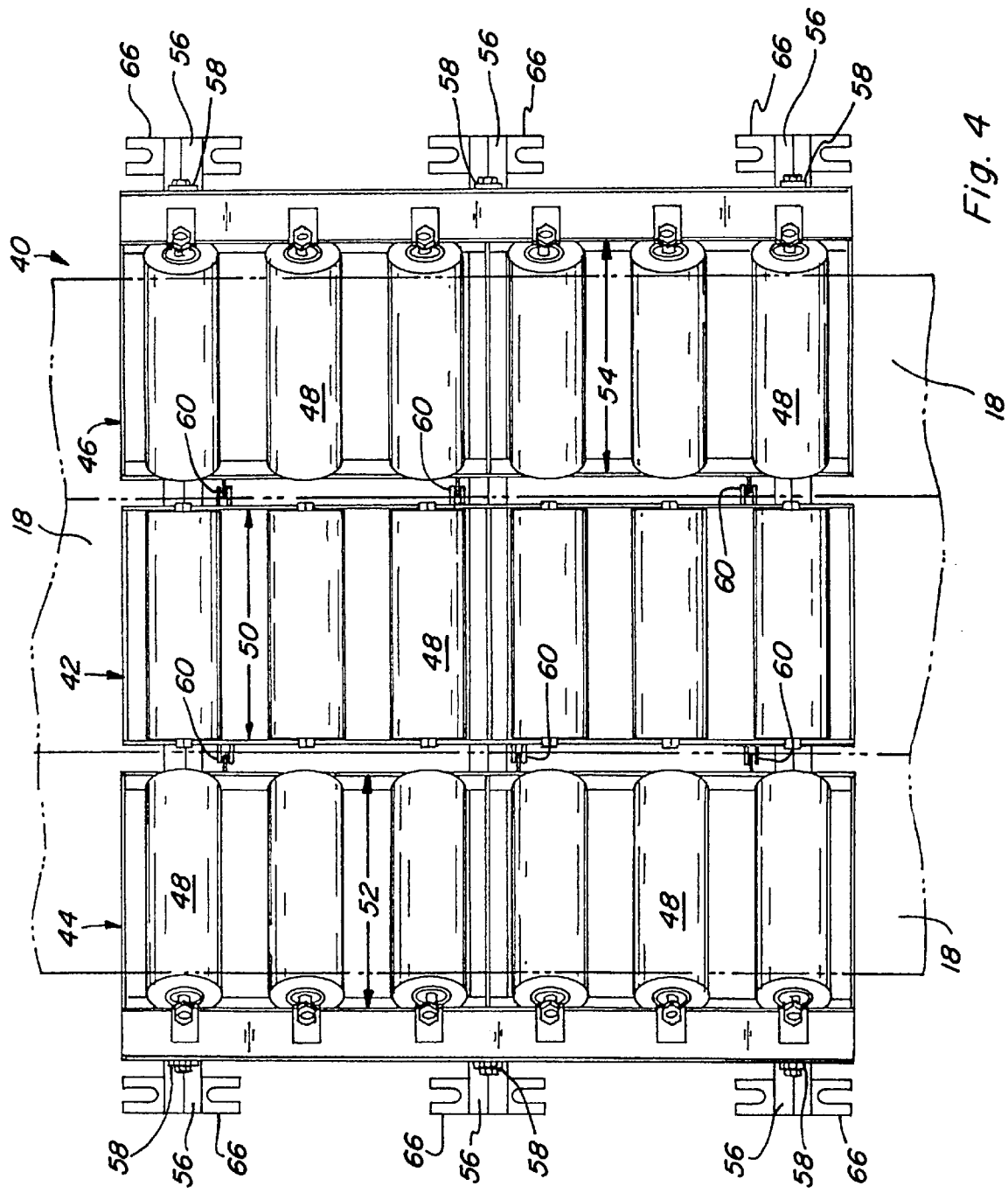

CONVEYOR BELT IMPACT SUPPORT SYSTEM

TECHNICAL FIELD

This invention relates generally to support mechanisms for conveyor belt transfer systems and, more particularly, to an impact roller bed belt support system which is specifically designed to provide support for a conveyor belt at the point of impact when material is transferred to the conveyor belt from an elevated location in a bulk material handling transfer operation.

BACKGROUND ART

Conveyor belts have long been used to move and transfer bulk material from one location to another. In the known material handling transfer systems such as those systems utilized in the coal industry for transferring coal in a mining operation, such transfer systems often times include transferring material from a first elevated conveyor belt system to a second lower conveyor belt system. In this particular application, the material being transferred from a first elevated belt system to a second lower belt system is typically allowed to free-fall and directly impact the second conveyor belt system. This direct impact of the falling material stream onto the second conveyor belt system typically produces a "trampoline" or pumping action of the conveyor belt in the impact area due to the impact of the falling material. This pumping action of the conveyor belt not only causes fugitive dust generation, but the impact forces generated by the falling material also cause damage to the belt as well as to the underlying conveyor support structure and other components.

In addition, if the conveyor belt is not properly supported at the area of impact, the impact forces can also create material spillage at the transfer location. Gaps between the belt and any skirting system or wear liner containing the dust particles within a typical material handling transfer system enclosure may likewise develop thereby allowing dust particles and material to escape and accumulate on conveyor components where such dust and material accumulation can wear idlers, seize bearings, and become entrapped in pinch points which will eventually gouge and damage the belt. Although many material handling transfer systems are equipped with mechanisms such as slider beds, saddles and impact cradles which are specifically designed to provide support for the conveyor belt at the impact location, as such slider beds, saddles or cradles begin to wear, the gap between the wear liner and the belt increases, all of which results in dust emissions and material spillage. Also, importantly, such known mechanisms also create more friction on the belt thereby inducing additional wear as well as requiring more overall amperage or electrical power to run the conveyor system.

Some of the known belt support systems such as impact cradles and slider beds utilize bar members comprised of some type of energy-absorbing material such as rubber which are typically installed in a heavy-duty frame to absorb the impact forces and hopefully dampen the "trampoline" action of the conveyor belt due to the falling material. Such bar members actually create more friction on the belt and, as a result, typically include some type of slick surface coating such as a polyurethane or polyethylene coating to help reduce the friction created by the belt moving over the bar members. Even with a slick surface outer coating, the known belt support systems still create friction between the belt and the belt support mechanism thereby further facilitating wear, tear, and damage to the belt.

It is therefore desirable to provide a conveyor belt impact support system which will not only absorb and reduce the impact forces generated by the falling material hitting the conveyor belt, but which system and mechanism would likewise substantially reduce the friction created between the support system and the moving conveyor belt to further reduce wear and tear on the belt. In addition, it is also desirable to provide a conveyor belt support system which would decrease the overall amperage or electrical power loads necessary to run the conveyor system as compared to the known impact cradles and slider beds presently available, and which system would provide a tight fit between the belt and any wear liner substantially reducing the escape of fugitive materials from the material handling transfer system in the impact area. Still further, it is also desirable to provide a conveyor belt support system which is easy to install and maintain.

Accordingly, the present invention is directed to overcoming one or more of the problems as set forth above.

SUMMARY OF THE INVENTION

In accordance will the teachings of the present invention, a conveyor belt impact support system is disclosed wherein a plurality of roller members or impact idlers are coupled together in a unitary adjustable structure so as to not only provide support to the conveyor belt at the impact transfer location, but to likewise substantially reduce fugitive dust emissions and material spillage as well as to substantially reduce any friction which may be generated due to the conveyor belt moving over the present belt support system. In this regard, the present system is particularly adaptable for use in coal mining operations where coal is being transferred from a first conveyor belt system to a second conveyor belt system, the first conveyor belt system being located at a higher elevation as compared to the second conveyor belt system. Still further, although the present belt impact support system will be described with reference to a belt-to-belt transfer operation, it is likewise equally adaptable for use in a bin-to-belt transfer application, a crusher-to-belt transfer application, and any other application where it is necessary to support a belt system at the impact transfer location.

The present conveyor belt support system includes three separate roller sections, each section including a plurality of roller members or idlers housed within a holding framework. Each roller section is mounted to a supporting structure such that the three roller sections are positioned in side-by-side relationship to each other. The center roller section is fixedly secured to the supporting structure whereas the two opposed end or wing roller sections are each adjustably and pivotally mounted to the center roller section and to the underlying support structure so as to be angularly movable and pivotable relative to the center roller section between a substantially horizontal and collapsed position wherein all three roller sections are in substantial alignment with each other and an angularly oriented position wherein the three roller sections form a trough or cradle adaptable for mating with a cradle containment channel formed by many bulk transfer conveyor systems. The pivotal adjustability of the wing roller sections allows the present system to be compatible with the known cradle type conveyor belt systems used in many bulk material transfer systems such as those transfer systems utilized in the coal industry.

When the three roller sections are positioned in their collapsed positioned so as to lie in a substantially horizontal plane, the present belt support system can be easily maneuvered under a particular conveyor belt system for easy installation, access and maintenance. Once positioned underneath the belt system at the transfer impact location, the present mechanism can be easily adjusted such that all three roller sections lie in close proximity to the particular belt configuration being utilized. Since each of the three sections forming the present mechanism include roller members, minimum friction and wear between the belt and the individual roller members forming the present system is encountered when the loaded conveyor belt actually makes contact with and moves across the present support system. This construction substantially reduces wear, tear and damage to the belt system at the impact location, and it likewise controls belt sag along the entire length of the impact zone thereby substantially reducing fugitive dust emissions and material spillage at the impact location.

The individual roller members forming the present system are typically comprised of a rubber or other elastic type material and include low friction-sealed bearings which substantially prevent seizure due to dust contamination. Also, the supporting structure and framework housing the present system can be manufactured from mild or stainless steel or other similar load bearing materials. In this regard, the present impact roller support system can be dimensioned so as to cover any particular belt length, or the present system can be formed in modular sections which can be positioned or otherwise mated in abutting relationship to cover any particular belt length.

The present conveyor belt support system therefore substantially eliminates many of the known problems associated with the known systems for dampening the load forces transferred to the conveyor belt as discussed above and provides a much more effective and more friction-less system for substantially reducing damage to the belt member in the impact zone as well as for minimizing belt vibration and improving the overall belt stability and sealing capability in the impact area. The present belt support system can be utilized and incorporated into a wide variety of different material handling transfer operations including in-line transfer operations as well as 90° or any other angular transfer operation regardless of the type of bulk material being transported from one elevated transfer location to a second lower transfer location. Other uses and applications are likewise possible.

It is therefore a principal object of the present invention to provide an improved conveyor belt support system which will reduce damage to the conveyor belt in the impact zone.

Another object is to provide a belt support system which will maintain a tight fit between the belt and the wear liner for substantially controlling and containing fugitive dust emissions and material spillage in the impact zone.

Another object is to provide a belt support system which will substantially reduce friction between the support mechanism and the conveyor belt as the belt moves across the support mechanism.

Another object is to teach the construction and operation of a belt support system which will lower operating costs by substantially eliminating belt damage due to heavy impact loading.

These and other advantages of the present invention will become apparent to those skilled in the art after considering the following detailed specification in conjunction with the accompanying drawings.

BRIEF DESCRIPTION OF THE DRAWINGS

For a better understanding of the present invention, reference may be made to the accompanying drawings in which:

FIG. 4 is a top plan view of the belt support system of FIG. 3;

DESCRIPTION OF THE PREFERRED EMBODIMENT OF THE INVENTION

Figure 1:
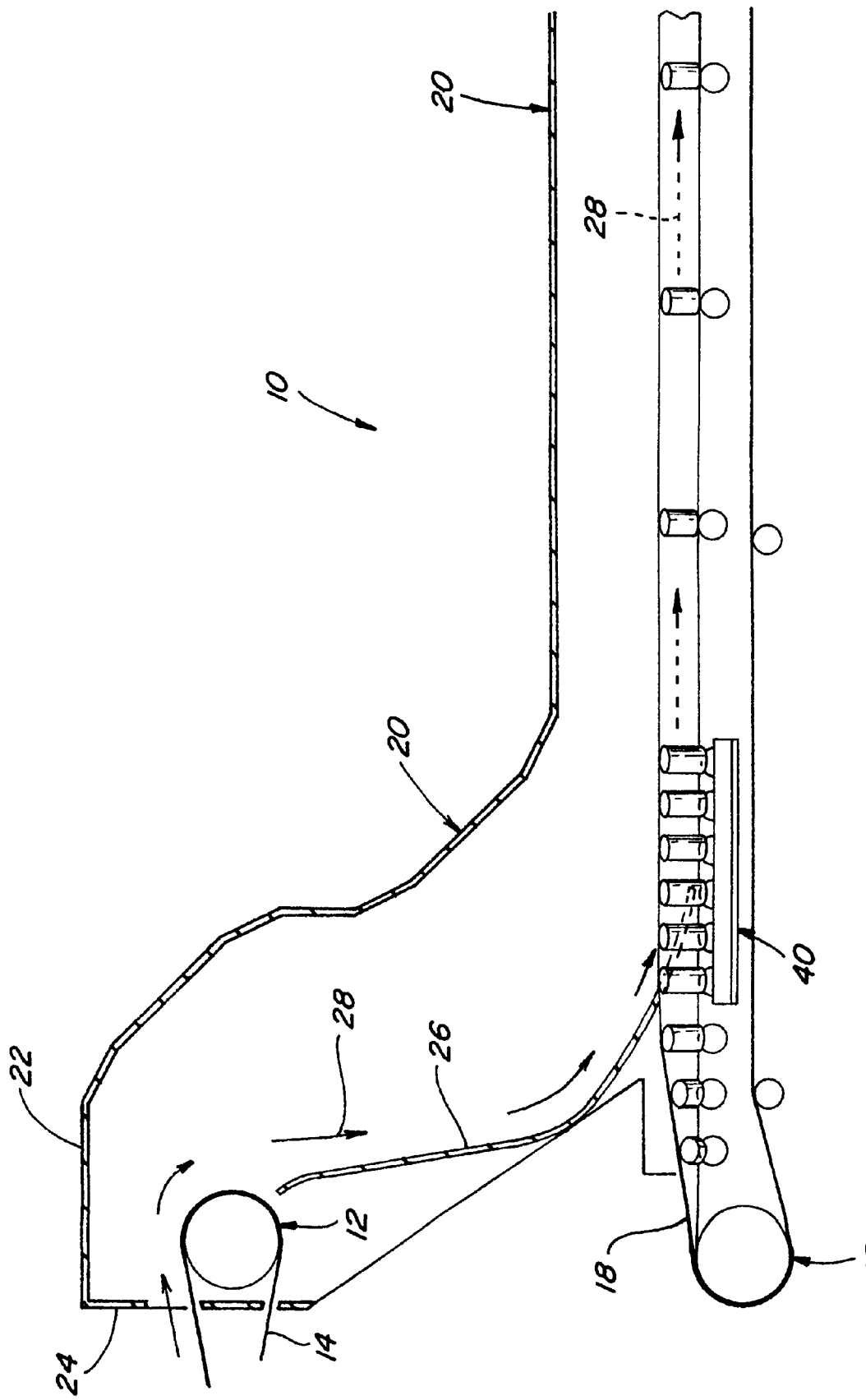
FIG. 1 is a partial cross-sectional side elevational view of a typical material handling transfer system incorporating the use of the present belt support system in the impact zone of the second lower conveyor belt system.

Referring to the drawings more particularly by reference numbers wherein like numerals refer to like parts, number 10 in FIG. 1 illustrates a typical material handling transfer system configured for use in a belt-to-belt transfer operation wherein bulk material such as coal is transferred from a first elevated conveyor belt system 12 to a second lower conveyor belt system 16. The first conveyor system 12 includes a moving belt member 14 which moves the bulk material from a first elevated location into the material handling transfer system 10 for delivery onto the moving belt member 18 associated with the second lower conveyor system 16. The conveyor systems 12 and 16 are of conventional construction and are supported in their respective operative positions in a conventional manner. The arrows 28 illustrated in FIG. 1 identify the direction of flow and a specific path taken by the bulk material as it moves through the transfer system 10 from the first conveyor belt system 12 to the second conveyor belt system 16.

The conveyor belt systems 12 and 16 are vertically separated as shown in FIG. 1 and the specific application illustrated in FIG. 1 represents an in-line transfer arrangement, that is, conveyor systems 12 and 16 are in substantially alignment with each other. Although the present conveyor belt support system 40 will be described with reference to an in-line belt-to-belt transfer operation, it is likewise equally adaptable for use in applications where the belt systems 12 and 16 are angularly oriented to each other as well as for use in bin-to-belt and crusher-to-belt transfer applications.

The transfer system 10 includes an enclosure 20 which completely encases the transfer location between the first conveyor belt system 12 and the second conveyor belt system 16. The enclosure 20 is used to ensure that all dust particles generated by the bulk material as it moves from belt 14 to belt 18 within the transfer system 10 will remain within the enclosure 20 and will not propagate back into the work area. In this regard, the containment enclosure 20 typically includes a hood portion such as the hood 22 which extends over the end or termination portion of the first conveyor system 12 as shown in FIG. 1 so as to completely enclose the ingress area where the bulk material departs belt 14 en route to belt 18. The hood portion 22 typically extends over a portion of the first conveyor belt system a sufficient distance to ensure that all dust particles generated within the containment system 10 will remain within the enclosure 20. A flexible curtain such as the curtain 24 is likewise often times utilized at the entry zone of the hood enclosure portion 22 so as to substantially cover the ingress zone into the transfer system 10. This curtain 24 functions to substantially prevent the backflow of dust particles within the containment system 10 from re-entering the work environment adjacent the entry location. Although many bulk material transfer systems allow the material to free-fall from the first belt conveyor system 12 to the second lower belt conveyor system 16, some material handling systems utilize a chute member such as the chute member 26 illustrated in FIG. 1 to help guide the bulk material onto the second conveyor belt system 16 and to help dampen the direct impact of the falling material stream onto belt member 18. Nevertheless, regardless of whether the bulk material is allowed to free-fall directly onto the second belt conveyor system 16, or whether a transfer chute such as the chute member 26 is used to reduce the direct impact of the bulk material onto belt member 18, the impact of the bulk material hitting belt member 18 in the impact area can cause severe damage not only to belt member 18, but also to the surrounding conveyor structure forming a part of conveyor belt system 16.

Figure 2:
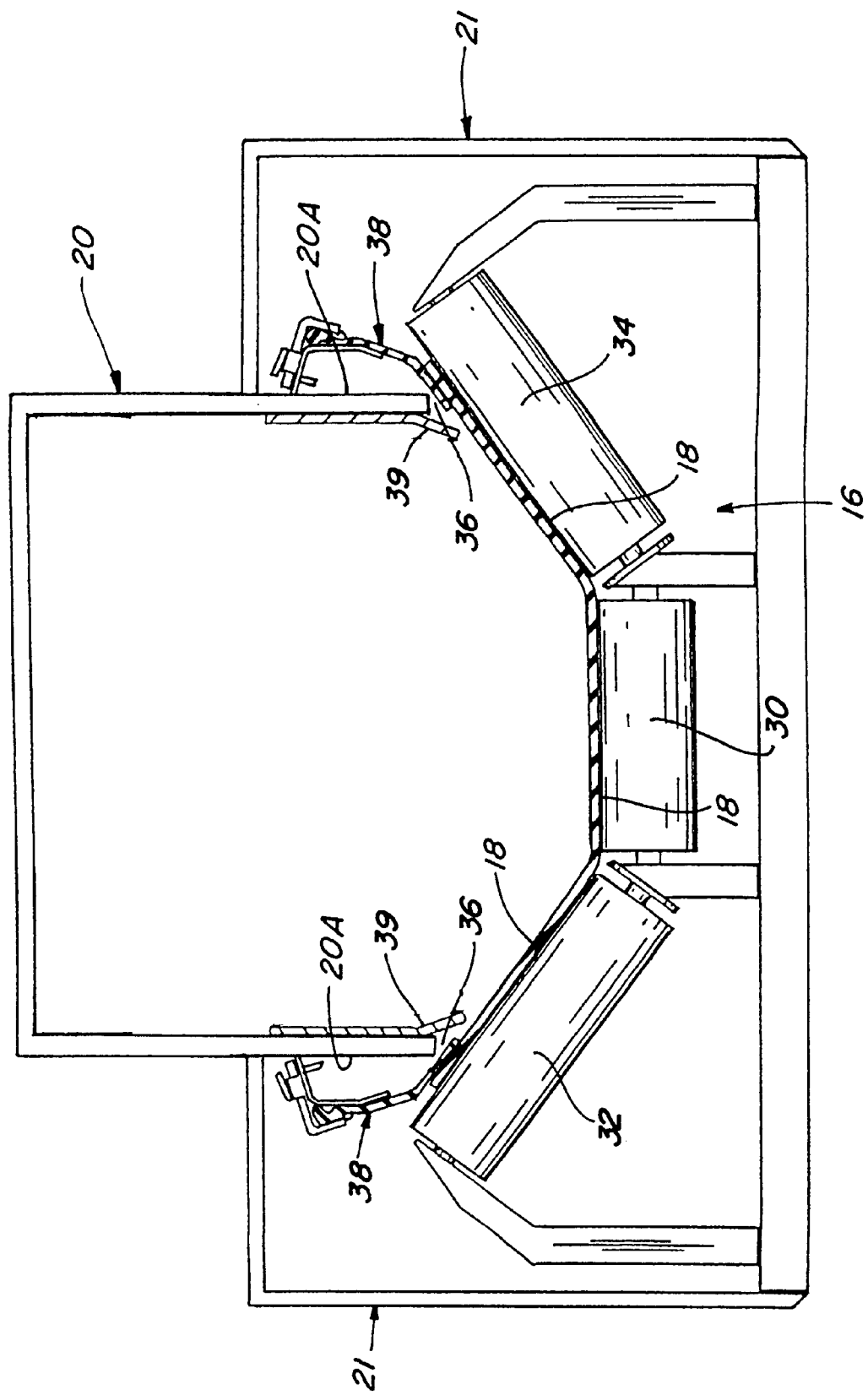
FIG. 2 is an end view of the material handling transfer system of FIG. 1 taken downstream from the impact zone of the second conveyor belt system showing a typical cradle type belt configuration.

FIG. 2 illustrates a typical construction of a conveyor belt system 16 used in the coal industry for transferring coal as well as the containment enclosure 20 which encases the conveyor system 16. Conveyor system 16 typically includes a plurality of spaced idlers extending along the length of the belt member 18 for supporting the belt member as it moves thereacross. Each set of spaced idlers typically includes a substantially stationary center idler portion 30 and two angularly moveable side idler portions 32 and 34. The side idler portions 32 and 34 are each respectively attached and/or connected to the center idler portion 30 by conventional means so as to be angularly movable relative to center portion 30. As such, the idler portions 30, 32 and 34 can be positioned so as to form a cradle containment channel for holding the bulk material as it is transported by a conveyor system 16. Cradle containment conveyor systems are typically used in material handling transfer systems and the conveyor idler portions 30, 32 and 34 can be adjusted and varied depending upon the type, size and rate of flow of the bulk material being transferred by the conveyor systems so as to more effectively control and contain the flow of material on the conveyor system and prevent spillage therefrom. The conveyor system 16 is supported and elevated in a conventional manner and the belt member 18 extends and moves across the upper surface of each set of conveyor idler portions 30, 32 and 34 in a conventional manner.

The efficiency and effectiveness of a transfer containment system such as the system 10 (FIG. 1) is likewise dependent upon effectively sealing the containment enclosure along the entire path of any plurality of conveyor systems comprising the overall material handling transfer operation such as the conveyor systems 12 and 16. As a result, it is important to effectively seal the enclosure 20 around the upper belt portion of conveyor system 16, particularly in the area where the bulk material first impacts the belt member 18 so as to control and contain any fugitive and respirable dust emissions generated in the impact zone of conveyor system 16. This is typically accomplished by having the opposed enclosure wall portions 20A extend downwardly to a position adjacent the belt member 18 on each opposite side of the conveyor system 16 as best shown in FIG. 2. The gap or space 36 formed between the terminal end portion of the respective enclosure wall portions 20A and belt member 18 is typically sealed through the use of a plurality of sealing clamps 38 which are positioned and located so as to engage the opposed end portions of the belt member 18 as best shown in FIG. 2. A liner member 39 is also typically attached to the inside portion of the respective enclosure side walls 20A so as to extend beyond the respective terminal end portions thereof to provide a further mechanism for sealing the gap 36 and containing any dust emissions within the enclosure 20 in the area above the conveyor system 16, particularly in the loading zone or impact area. The enclosure 20 is attached to the conveyor idler support frame 21 in a conventional manner.

If the belt member 18 is not properly supported in the impact area due to the impact forces of the material hitting belt member 18, the belt will sag between the idlers and gaps between the belt member 18, the sealing clamps 38 and the liner member 39 will develop and allow fugitive dust emissions and material to escape. Although the members 20A, 38 and 39 illustrate one mechanism for effectively sealing the enclosure 20 around the conveyor system 16, it is recognize and anticipated that a wide variety of other sealing methods and means are typically utilized to accomplish this task. To alleviate the impact stresses on belt member 18 at the impact area, the present belt support system 40 is mounted to the support structure of the second conveyor system 16 in the area where the material from conveyor system 12 impacts belt member 18 as generally shown in FIG. 1.

Figure 5:
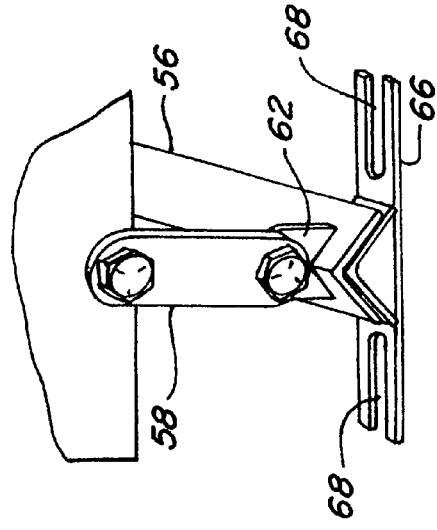
FIG. 5 is a partial perspective view of a portion of the supporting structure associated with the present belt support system.
Figure 3:
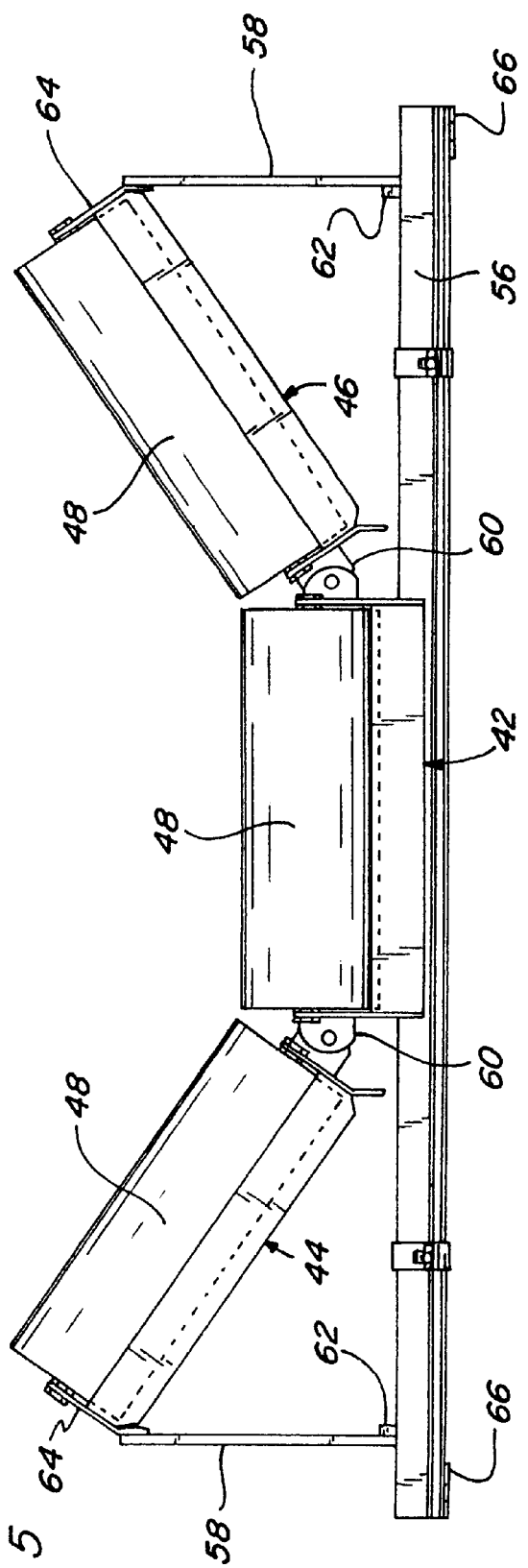
FIG. 3 is an end view of the present belt support system constructed in accordance with the teachings of the present invention showing the wing roller sections in angular orientation relative to the center roller section.

The present belt support system 40 illustrated in FIGS. 3–5 includes three separate roller sections 42, 44 and 46, each section including a plurality of roller members 48 housed within a holding structure such as the frame structures 50, 52 and 54 illustrated in FIG. 4. In this regard, the plurality of roller members 48 associated with the respective roller sections 42, 44 and 46 are each rotatably mounted to their respective support frame structures 50, 52 and 54 in a conventional manner. The individual roller members 48 are typically comprised of an energy-absorbing rubber material capable of both absorbing and dampening the impact forces generated by the bulk material hitting belt member 18, although other energy-absorbing elastic type materials may likewise be utilized depending upon the particular application involved and depending upon the type, size, and rate of flow of the bulk material impacting belt member 18. Also, each roller member 48 preferably includes appropriate sealed bearings for substantially reducing any friction which may occur as the belt member moves across the respective roller members 48 and for substantially preventing bearing seizure due to dust and material contamination.

Each roller section 42, 44 and 46 is mounted to a supporting structure such that the three roller sections are positioned in side-by-side relationship to each other as best illustrated in FIGS. 3 and 4. The center roller section 42 is fixedly secured to the transverse supporting members 56 whereas the respective end or wing roller sections 44 and 46 are each adjustably positionable and attached relative to the support members 56 via connecting members 58 as will be hereinafter further explained. The two end roller sections 44 and 46 are each pivotally attached adjacent one side portion thereof to the respective side portions of frame structure 50 as best illustrated in FIGS. 3 and 4. This pivotal attachment is accomplished through the use of a plurality of conventional bracket type pivot means 60 (FIGS. 3 and 4). Any number of pivotal connections such as the connections 60 may be utilized between the various roller sections 42, 44 and 46 depending upon the overall length of each roller section comprising the present belt support system.

Likewise, it is recognized and anticipated that other pivot means may likewise be utilized to angularly orient the two opposed end or wing roller sections 44 and 46 relative to the center roller section 42 so as to conform the present belt support system to the configuration of the cradle containment channel formed by the particular conveyor belt system to be supported such as the conveyor system 16 illustrated in FIGS. 1 and 2.

The end or wing roller sections 44 and 46 are pivotally adjusted relative to the center roller section 42 through the use of a plurality of connecting members 58 as best illustrated in FIGS. 3 and 5. The members 58 are positioned between the respective transverse support members 56 and the respective outer side wall portion of the roller sections 44 and 46, one end portion of the members 58 being fixedly secured to a flange member 62 associated with the respective support members 56 while the opposite end portion of the members 58 is fixedly secured to a bracket member 64 associated with the outer side wall portion of roller sections 44 and 46 as best illustrated in FIG. 3. Attachment to the flange and bracket members 62 and 64 is accomplished in a conventional manner such as by using conventional fastener means as best illustrated in FIG. 5. The overall height of the respective members 58 will determine the angular position and orientation of the wing sections 44 and 46 relative to the center section 42. In this regard, a plurality of members 58 having different lengths can be provided to achieve a plurality of different angular orientations between the respective sections 42, 44 and 46 based upon the particular cradle or channel configuration associated with the particular belt system to be supported such as the belt configuration illustrated in FIG. 2, or each of the members 58 can be made adjustable such as through a telescoping arrangement wherein the overall length of each respective member 58 can be varied to achieve any particular angular orientation. It is recognized and anticipated that still other configurations and other means associated with the members 58 can be utilized to adjust the angular orientation of the wing sections 44 and 46 relative to the center section 42.

As best shown in FIGS. 4 and 5, the transverse support members 56 each include a flange or foot portion 66 associated with each opposite end portion thereof, the flange or foot portions 66 being positioned substantially perpendicular to the respective members 56 and each including a pair of slots 68 for receiving a conventional fastening member. The foot portions 66 are utilized to position and support the present conveyor belt support system 40 on the existing conveyor belt support structure supporting belt member 18. In this regard, the foot portions 66 are typically positioned on existing conveyor belt stringer members located immediately below belt member 18 in the vicinity of the impact zone. The respective foot portions 66 are fixedly attached to the conveyor stringer members via the slots 66 and appropriate fastening members. Adjustment of the center roller section 42 relative to the underside center portion of belt member 18 can be accomplished through the use of spacer members or shims positioned beneath each of the respective foot portions 66. Angular adjustment of the wing roller sections 44 and 46 is then accomplished as previously explained.

Figure 6:
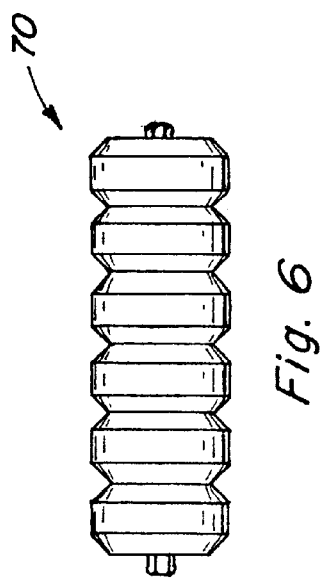
FIG. 6 is a side elevational view of another embodiment of a roller member which can be utilized with the present belt support system.

Although the individual roller members 48 illustrated in FIGS. 3 and 4 are shown as being substantially smooth roller members, it recognized and anticipated that any roller configuration can be utilized with the present support system 40 such as the roller member configuration 70 illustrated in FIG. 6 depending upon the type, size and rate of flow of the bulk material being transferred to the particular conveyor system as well as the belt width and speed. Installation of the present belt support system 40 can be easily accomplished by lowering the wing roller sections 44 and 46 into their fully collapsed positioned wherein all three roller sections 42, 44 and 46 lie in a substantially horizontal plane and thereafter sliding the entire unit 40 under the particular conveyor belt system for mounting to the appropriate conveyor stringer members. When in its fully collapsed position, the present belt support system 40 provides for easily installation, access and maintenance.

In addition, the present belt support system 40 can be dimensioned so as to cover any particular belt length depending upon the overall size of the particular impact zone involved, or the present system can be formed in modular sections which can be positioned or otherwise mated in abutting relationship to each other to cover any particular belt length. In this regard, the overall width of the entire unit 40 as well as the individual roller sections 42, 44 and 46 can vary depending upon the particular application and the particular belt width involved. It is also recognized and anticipated that the width of the respective roller sections 42, 44 and 46 may likewise vary within the same support system 40. For example, the width of the center roller section 42 illustrated in FIG. 4 may be different from the width of each of the wing roller members 44 and 46. Still further, it is recognized and anticipated that any plurality of roller sections may be incorporated into the present unit 40 depending upon the particular application and belt configuration. In this regard, the present system 40 may include more than one non-pivotal center roller section 42 which is secured to the supporting structure such as by securing another roller section to the support members 56 adjacent roller section 42, and the present system may likewise include more than one pivotal roller section associated with the opposite side portions of the overall unit such as by pivotally attaching an additional roller section to the outer side portion of roller sections 44 and/or 46. Still other variations and modifications are likewise anticipated.

Use of the present conveyor belt support system 40 at the impact area of a particular conveyor belt will help to alleviate the forces and stresses applied to the belt member 18 due to the impact of the bulk material falling thereon; it will help to stabilize the belt member 18 at the transfer point to prevent spillage of material and damage to conveyor components; it will help save wear and tear on the overall belt member 18; it will substantially reduce fugitive dust emissions in the impact area; and it will increase the overall longevity of the belt member 18. Also, importantly, since the present support system 40 utilizes a plurality of roller members 48, the present system substantially reduces friction between the support system and the conveyor belt moving thereacross in the impact zone, which feature likewise helps to reduce the overall amperage or electrical power requirements necessary to operate conveyor system 16 and to keep the belt member 18 moving at a predetermined belt speed.

As is evidenced from the foregoing description, certain aspects of the present invention are not limited to the particular details of the examples illustrated herein, and it is therefore contemplated that other modifications, variations, and other uses and applications of the present invention will become apparent to those skilled in the art after considering this specification and the accompanying drawings. All such changes, modifications, variations and other uses and applications which do not depart from the spirit and scope of the invention are deemed to be covered by the present invention.

Other aspects, objects and advantages of the present invention can be obtained from a study of the drawings, the disclosure and the appended claims.

What is claimed is:

1. An apparatus for supporting a conveyor belt member in an impact zone when the belt member is moving under load with a flow of material, said apparatus comprising:

a first roller section fixedly secured to a support structure;

second and third roller sections pivotally attached to said first roller section;

each of said first, second and third roller sections including a plurality of roller members rotatably mounted to said roller sections and extending along a portion of the length of the belt member, said second and third roller sections being angularly adjustable relative to said first roller section between a first position wherein said first, second and third roller sections lie in a substantially horizontal plane and a second position wherein said second and third roller sections are angularly oriented relative to said first roller section; and means engageable with said support structure and with said second and third roller sections for holding said second and third roller sections at a particular angular orientation relative to said first roller section;

said first, second and third roller sections being positionable to conform to the configuration of the conveyor belt member in the impact zone such that the conveyor belt member at least periodically engages said roller members when the belt member is moving under load.

2. The apparatus, as set forth in claim 1, wherein said means for holding said second and third roller sections at a particular angular orientation relative to said first roller section includes at least one connecting member associated with each of said second and third roller sections, each of said connecting members having opposed end portions, one end portion of said connecting members being attachable to said support structure, the other end portion of at least one of said connecting members being attachable to said second roller section, and the other end portion of at least one of said connecting members being attachable to said third roller section.

3. The apparatus, as set forth in claim 1, wherein each of said first, second and third roller sections includes a frame structure, said roller members being rotatably mounted to said frame structures.

4. The apparatus, as set forth in claim 1, wherein the conveyor belt member is supported by a conveyor structure, the supporting structure of said apparatus being mounted in operative position below the conveyor belt member and to the conveyor structure.

5. The apparatus, as set forth in claim 1, wherein said plurality of roller members are comprised of an elastic type material.

6. The apparatus, as set forth in claim 1, wherein said second roller section is pivotally attached to one side portion of said first roller section, and wherein said third roller section is pivotally attached to the opposite side portion of said first roller section.

7. The apparatus, as set forth in claim 1, wherein the belt member forms a cradle containment channel, said first, second and third roller sections being positionable to conform to the cradle containment channel configuration of the belt member.

8. A belt support system for supporting a belt member at a predetermined impact location during a material transfer operation wherein material is allowed to impact the belt member at the predetermined impact location during the transfer operation, said system comprising:

a plurality of roller sections;

each of said roller sections including a plurality of roller members extending along a portion of the length of the belt member and housed within a frame structure, each of said roller members being rotatably movable when the belt member is moving and makes contact with said roller members;

at least one of said plurality of roller sections being secured to a support structure;

at least one of said plurality of roller sections being pivotally attached to the frame structure of at least one of said roller sections which is secured to said support structure adjacent one side portion thereof, and at least one of said roller sections being pivotally attached to the frame structure of at least one of said roller sections which is secured to said support structure adjacent an opposite side portion thereof;

said pivotal roller sections being angularly adjustable relative to said at least one roller section which is secured to said support structure between a first position wherein said plurality of roller sections lie in a substantially horizontal plane and a second position wherein said pivotal roller sections are angularly positionable relative to said at least one roller section which is secured to said support structure;

said plurality of roller sections being positionable to conform to the belt member at the predetermined impact location such that the belt member at least occasionally engages said roller members when the belt member is moving during a material transfer operation; and means engageable with said support structure and with said pivotal roller sections for holding said pivotal roller sections at a particular angular orientation relative to said at least one roller section which is secured to said support structure.

9. The belt support system, as set forth in claim 8, wherein said means for holding said pivotal roller sections at a particular angular orientation relative to said at least one roller section which is secured to said support structure includes at least one member attachable to each of said pivotal roller sections, each of said attachable members having opposed end portions, one end portion of said attachable members being attachable to said support structure and the other end portion of said attachable members being attachable to one of said pivotal roller sections.

10. The belt support system, as set forth in claim 8, wherein at least two of said plurality of roller sections are secured to said support structure, at least one of said plurality of roller sections being pivotally attached to the frame structure of one of said roller sections which is secured to said support structure, and at least one of said plurality of roller sections being pivotally attached to the frame structure of the other of said roller sections which is secured to said support structure.

* * * * *